United States Patent
Dougherty et al.

(10) Patent No.: US 11,650,308 B2
(45) Date of Patent: May 16, 2023

(54) SYSTEM AND METHOD FOR DETECTING BALLISTIC TARGETS

(71) Applicant: SRC, INC., North Syracuse, NY (US)

(72) Inventors: John C. Dougherty, Liverpool, NY (US); Robert E. Hiemenz, Liverpool, NY (US)

(73) Assignee: SRC, INC., North Syracuse, NY (US)

(*) Notice: Subject to any disclaimer, the term of this patent is extended or adjusted under 35 U.S.C. 154(b) by 166 days.

(21) Appl. No.: 17/169,732

(22) Filed: Feb. 8, 2021

(65) Prior Publication Data

US 2022/0252715 A1 Aug. 11, 2022

(51) Int. Cl.
*G01S 13/88* (2006.01)
*G01S 13/50* (2006.01)
*F41G 3/08* (2006.01)

(52) U.S. Cl.
CPC .............. *G01S 13/883* (2013.01); *F41G 3/08* (2013.01); *G01S 13/505* (2013.01)

(58) Field of Classification Search
CPC ......... G01S 13/883; G01S 13/505; F41G 3/08
See application file for complete search history.

(56) References Cited

U.S. PATENT DOCUMENTS

| 10,627,503 B2 * | 4/2020 | Vacanti | F41H 11/00 |
| 2018/0003816 A1 * | 1/2018 | Olson | G01S 13/87 |

\* cited by examiner

*Primary Examiner* — Peter M Bythrow
*Assistant Examiner* — Nazra Nur Waheed
(74) *Attorney, Agent, or Firm* — George McGuire (57) ABSTRACT

A radar system, comprising: a receive antenna configured to receive a receive signal reflected from a bullet, the receive signal exhibiting a Doppler shift according to the motion of the bullet; and a detector implementing a set of matched filters each configured to determine a measure of correlation between the Doppler shift of the receive signal and one of a set of pre-stored Doppler shifts, wherein each of the pre-stored Doppler shifts respectively represents the Doppler shift of a bullet passing the antenna at a different speed or a distance of a point of closest approach.

14 Claims, 5 Drawing Sheets

SYSTEM AND METHOD FOR DETECTING BALLISTIC TARGETS

BACKGROUND

Bullet detection and tracking is useful for detecting enemy snipers in the field. But the detection of bullets, given their speed and small size, is difficult for traditional radar. A traditional pulsed radar can be employed to detect and track a bullet, but, given the size and speed of the bullet, this generally requires tremendous power and aperture, resulting in a very large, heavy, and complex system that limits the capability of the radar to deployed in the field.

A continuous-wave radar can transmit continuously, placing significantly more energy on a target, thus permitting a lower-powered, smaller antenna to detect the target out to longer ranges. But it is difficult for continuous-wave radars to detect the range of a target without sophisticated waveforms and timing. Also, given the doppler smear of a bullet, standard doppler-processing detection methods are inadequate for bullet detection.

Accordingly, there exists a need in the art for a continuous-wave radar to be able to detect a bullet in-flight and for determining the position of the shooter.

SUMMARY

All examples and features mentioned below can be combined in any technically possible way.

According to an aspect, a radar system includes a receive antenna configured to receive a receive signal reflected from a ballistic target, the receive signal exhibiting a Doppler shift according to motion of the ballistic target; and a detector implementing a set of matched filters each configured to determine a measure of correlation between the Doppler shift of the receive signal and one of a set of pre-stored Doppler shifts, wherein each of the pre-stored Doppler shifts respectively represents the Doppler shift of a ballistic target passing the antenna at a different speed or a distance of a point of closest approach.

In an example, the detector is configured to compare the output of at least a first matched filter of the set of matched filters to a threshold to determine whether the output is indicative of a match between the receive signal and the pre-stored Doppler shift of the first matched filter.

In an example, the detector is further configured to determine an estimated trajectory of the ballistic target based on an azimuth-angle estimation algorithm, upon determining that the output of at least the first matched filter exceeds the threshold.

In an example, the detector is further configured to estimate a point of origin of according to, at least, the estimated trajectory of the ballistic target.

In an example, the azimuth-angle estimation algorithm is one of amplitude-comparison monopulse, phase-comparison monopulse, full vector monopulse, or maximum likelihood estimation.

In an example, the detector is further configured to correct the estimated trajectory of the ballistic target according to at least one of an estimated speed or an estimated distance of the point of closest approach, wherein the estimated speed or the estimated distance of the point of closest approach is based, at least in part, on the speed or the distance of the point of closest approach represented by the Doppler shift of the first matched filter.

In an example, the estimated speed is determined by interpolating the speed represented by the Doppler shift of the first matched and a speed represented by a second matched filter, wherein an output of the second matched filter exceeds the threshold.

In an example, the estimated distance of the point of closest approach is determined by interpolating the distance of the point of closest approach represented by the Doppler shift of the first matched and a speed represented by a second matched filter, wherein an output of the second matched filter exceeds the threshold.

In an example, the radar system is a continuous-wave radar.

In an example, the radar system is a pulsed radar.

According to another aspect, a method for detecting a ballistic target with a radar system includes the steps of: receiving with an antenna a receive signal reflected from a ballistic target, the receive signal exhibiting a Doppler shift according to motion of the ballistic target; and determining a measure of correlation between the Doppler shift of the receive signal and each of a set of pre-stored Doppler shifts, wherein each of the pre-stored Doppler shifts respectively represents the Doppler shift of a ballistic target passing the antenna at a different speed or a distance of a point of closest approach.

In an example, the method further includes the step of comparing the measure of correlation between the receive signal and at least a first pre-stored Doppler shift of the set of pre-stored Doppler shifts to a threshold to determine whether the measure of correlation is indicative of a match between the receive signal and the first pre-stored Doppler shift.

In an example, the method further includes the step of determining an estimated trajectory of the ballistic target based on an azimuth-angle estimation algorithm, upon determining that the measure of correlation between the receive signal and at least the first pre-stored Doppler shift of the set of pre-stored Doppler shifts exceeds the threshold.

In an example, the method further includes the step of estimating a point of origin of according to, at least, the estimated trajectory of the ballistic target.

In an example, the azimuth-angle estimation algorithm is one of amplitude-comparison monopulse, phase-comparison monopulse, full vector monopulse, or maximum likelihood estimation.

In an example, the method further includes the step of correcting the estimated trajectory of the ballistic target according to at least one of an estimated speed or an estimated distance of the point of closest approach, wherein the estimated speed or the estimated distance of the point of closest approach is based, at least in part, on the speed or the distance of the point of closest approach represented by the first pre-stored Doppler shift.

In an example, the estimated speed is determined by interpolating the speed represented by the first pre-stored Doppler shift and a speed represented by a second pre-stored Doppler shift, wherein the measure of correlation between the receive signal and the second pre-stored Doppler shift exceeds the threshold.

In an example, the estimated distance of the point of closest approach is determined by interpolating the distance of the point of closest approach represented by the first pre-stored Doppler shift and a distance of the point of closest approach represented by a second pre-stored Doppler shift, wherein the measure of correlation between the receive signal and the second pre-stored Doppler shift exceeds the threshold.

In an example, the radar system is a continuous-wave radar.

In an example, the radar system is a pulsed radar.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Various examples and methods described in this disclosure are directed toward methods and systems for detecting high speed ballistic targets, such as bullets, using a radar, such as a continuous-wave radar. According to various examples, a measure of correlation between the Doppler shifts observed in the received signal is compared to a set of pre-stored Doppler shifts to detect the presence of the high-speed ballistic target, each pre-stored Doppler shift representing a different speed or distance of a point of closest approach of the high-speed ballistic target. The presence of a high-speed ballistic target is detected when a match between the observed Doppler shifts over time for a target and the pre-stored Doppler shifts over time is determined. Once a high-speed ballistic target is detected, an estimated trajectory can be determined using, at least, azimuth angle estimation techniques. The estimated trajectory can be further refined according to an estimated speed and/or distance of the point of closest approach determined, at least in part, by the matching pre-stored Doppler shift curves. These and other examples will be further described below in connection with the drawings.

While the examples described below will be described in connection with the detection of a bullet, it should be understood that these examples can be used to detect any ballistic target that renders a radar return having a Doppler shift that varies according to speed and distance of closest approach.

Figure 1:
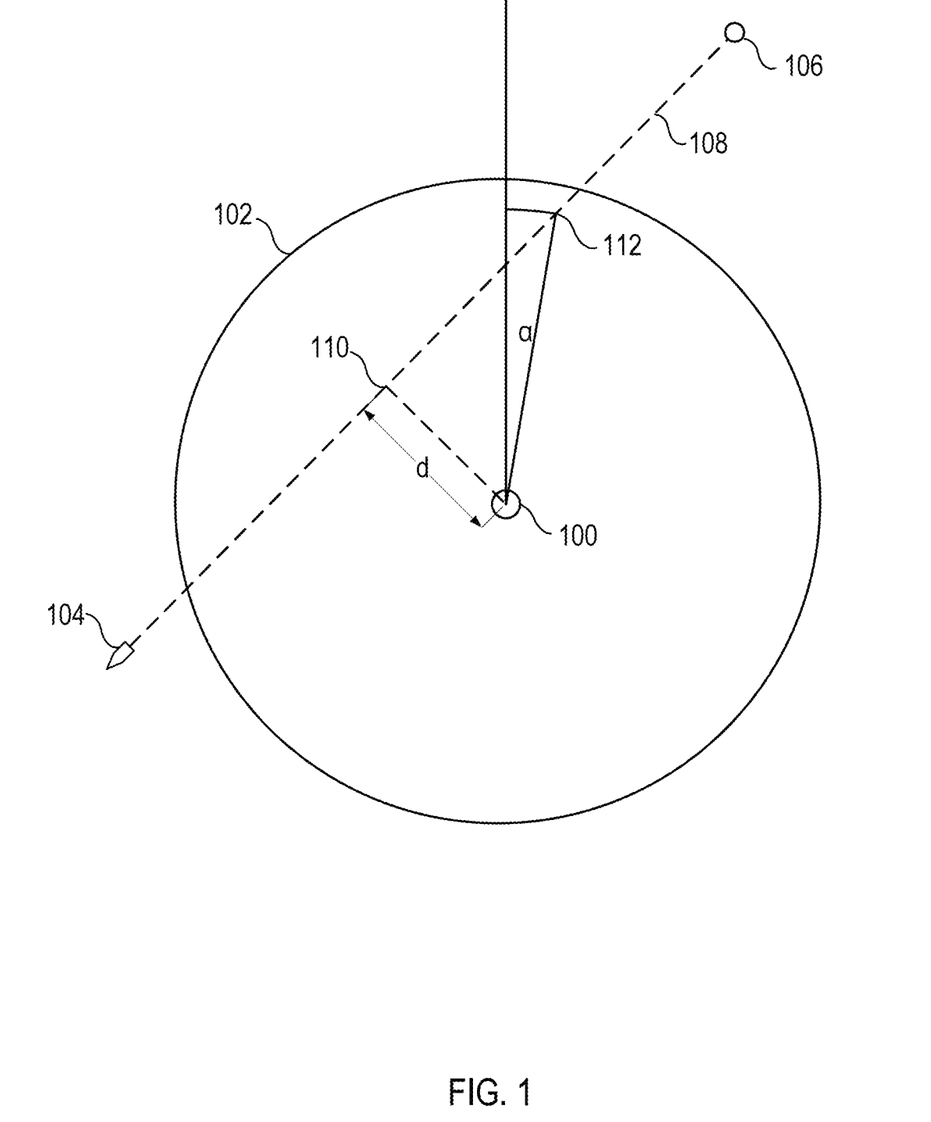
FIG. 1 is a top view of a bullet traveling through the radar coverage of a radar system, according to an example.

FIG. 1 depicts a simplified top view of a radar 100 having a radar coverage 102. (The circle used to represent the radar coverage is only used to simplify the drawings and should not be understood to limit the radars described in this disclosure to having 360° coverage or to otherwise suggest a necessary coverage geometry.) FIG. 1 further represents an example bullet 104 having been fired from an origin point 106 (i.e., the location of the shooter) traveling on a flight path 108, which passes the radar 100 at point of closest approach 110 at distance d to the radar. The distance d of the point of closest approach is measured from the center of the receive antenna to bullet path 108, although this value can be converted to correspond to various other reference points.

Figure 2A:
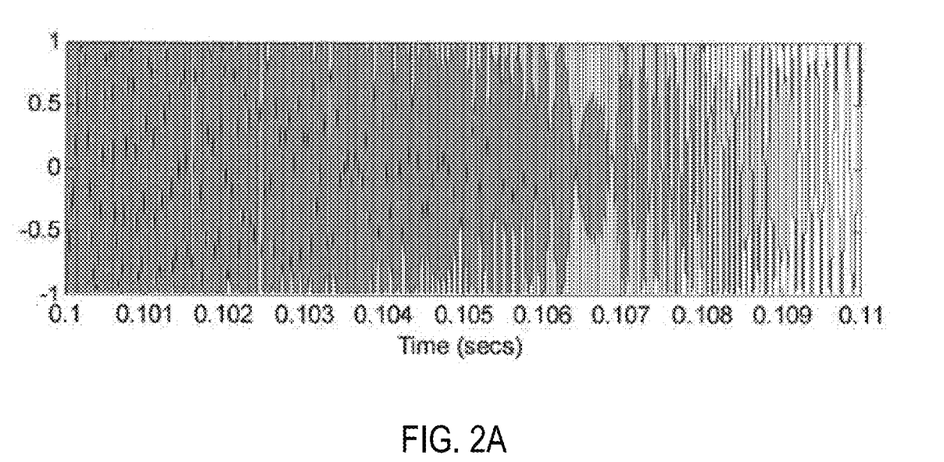
FIG. 2A is a time-domain plot of the return of a bullet traveling through radar coverage, according to an example.
Figure 2B:
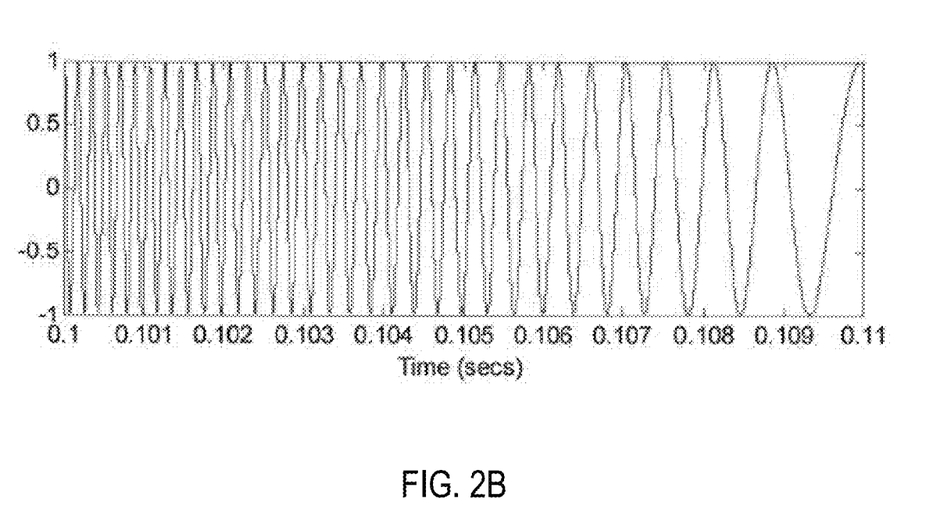
FIG. 2B is a time-domain plot of the return of a bullet traveling through radar coverage, according to an example.

Although most continuous-wave radars are unable to detect range (due to the absence of a pulse-repetition interval), the passing of a bullet will effect an identifiable Doppler shift in the return signals. For example, in FIG. 2A and FIG. 2B there is shown a simulated time-domain representation of the return of a passing bullet. Because a continuous-wave radar transmits a single, continuous tone, the receive signal will exhibit a frequency-modulated tone, which changes in frequency as the bullet passes. Thus, in FIGS. 2A and 2B the period of the waveform continuously changes over time as the bullet approaches and passes the radar. This modulation is different for bullets that pass closely compared to bullets that pass at longer ranges. More particularly, the receive signals from bullets that pass at close ranges will exhibit higher Doppler shifts than for bullets that pass at longer ranges. Thus, FIG. 2A, which depicts the time-domain receive signal of a bullet passing at 10 meters, exhibits a greater Doppler shift, i.e., frequency shift (observable as shorter periods), than the receive signal of FIG. 2B, which is from a bullet passing at 100 meters.

Figure 3:
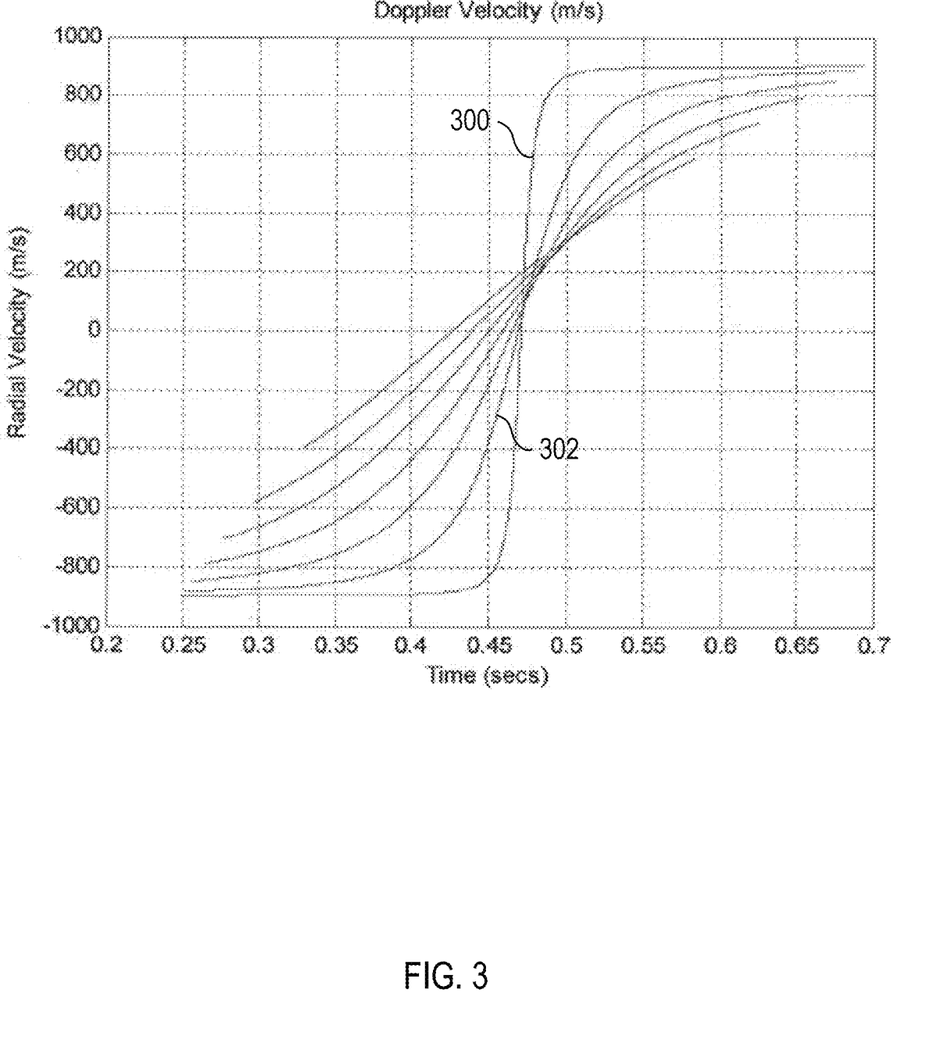
FIG. 3 is a plot of Doppler velocity over time for a plurality of bullets traveling at different distances from the radar antenna, according to an example.

This can be further observed in FIG. 3, which depicts a series of overlaid Doppler velocity versus time curve for six separate bullets, each traveling at 900 m/s at different minimum ranges from the radar. (Doppler velocity is the radial component of the velocity vector of the bullet, as derived from the frequency shift in the receive signal.) As shown, the Doppler velocity curves become steeper around zero Doppler as the distance of the point of closest approach decreases. Stated differently, the Doppler velocity curves become steeper, and the change in Doppler shift becomes greater, as the bullets pass closer to the radar. Thus, curve 300, which represents the simulated Doppler velocity of a bullet passing at approximately 10 m is steeper around zero Doppler than curve 302, which represents the simulated Doppler velocity of a bullet passing at approximately 100 m.

Bullets traveling at different speeds will expand (if moving faster) or compress (if moving slower) the curves of FIG. 3. For example, it can be observed that when the bullet is at greater distances from the radar (i.e., outside of the transition around zero Doppler) the curve tends to approach the actual speed of the bullet. This is particularly true for the measured curves of bullets that travel closer to the radar, such as curve 300, which flattens before approximately 0.4 seconds and after approximately 0.55 seconds at Doppler velocities of approximately −900 m/s and 900 m/s, respectively. If the bullet was traveling slower, such as at 800 m/s, but at the same distance from the radar, the curve would approach −800 and 800 m/s at either end, thus effectively compressing curve 300. Similarly, if the bullet was traveling faster, such as at 1000 m/s, but at the same distance from the radar, the curve would approach −1000 m/s and 1000 m/s, thus effectively expanding curve 300.

In sum, the characteristics of the of the Doppler velocity (or the Doppler shift) versus time of the receive signal will change with bullet speed and point of closest approach. These characteristics can be leveraged to detect the presence of a bullet and to determine the bullet's speed and the distance of the point of closest approach from the radar, as will be described in connection with the radar 400 of FIG. 4 and method 500. In addition, once a bullet is detected, techniques for azimuth angle estimation can be used to determine an estimate of the bullet's trajectory and the location of the bullet's origin.

Figure 4:
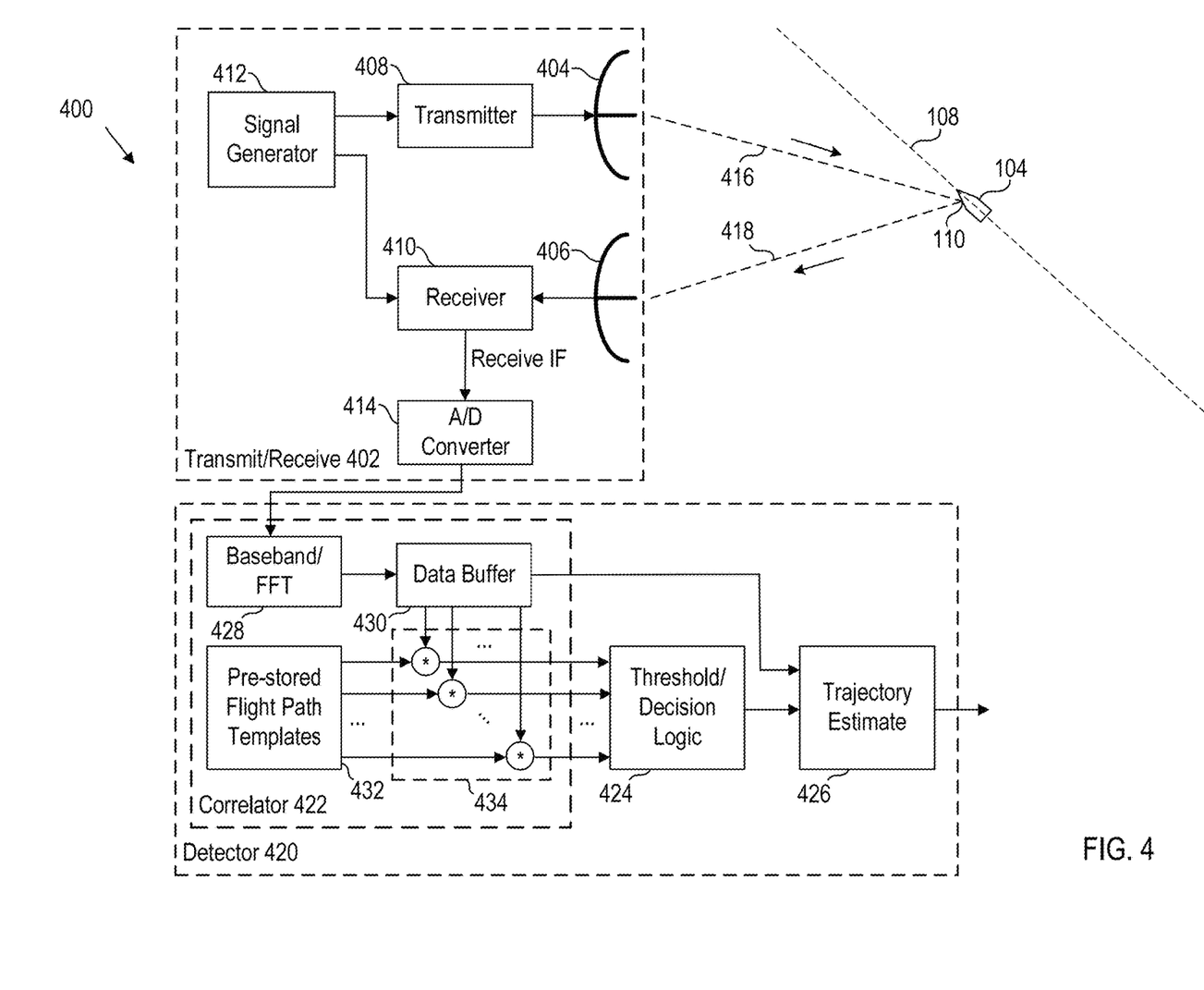
FIG. 4 is a schematic of a radar system for detecting high-speed ballistic targets, according to an example.
Figure 5:
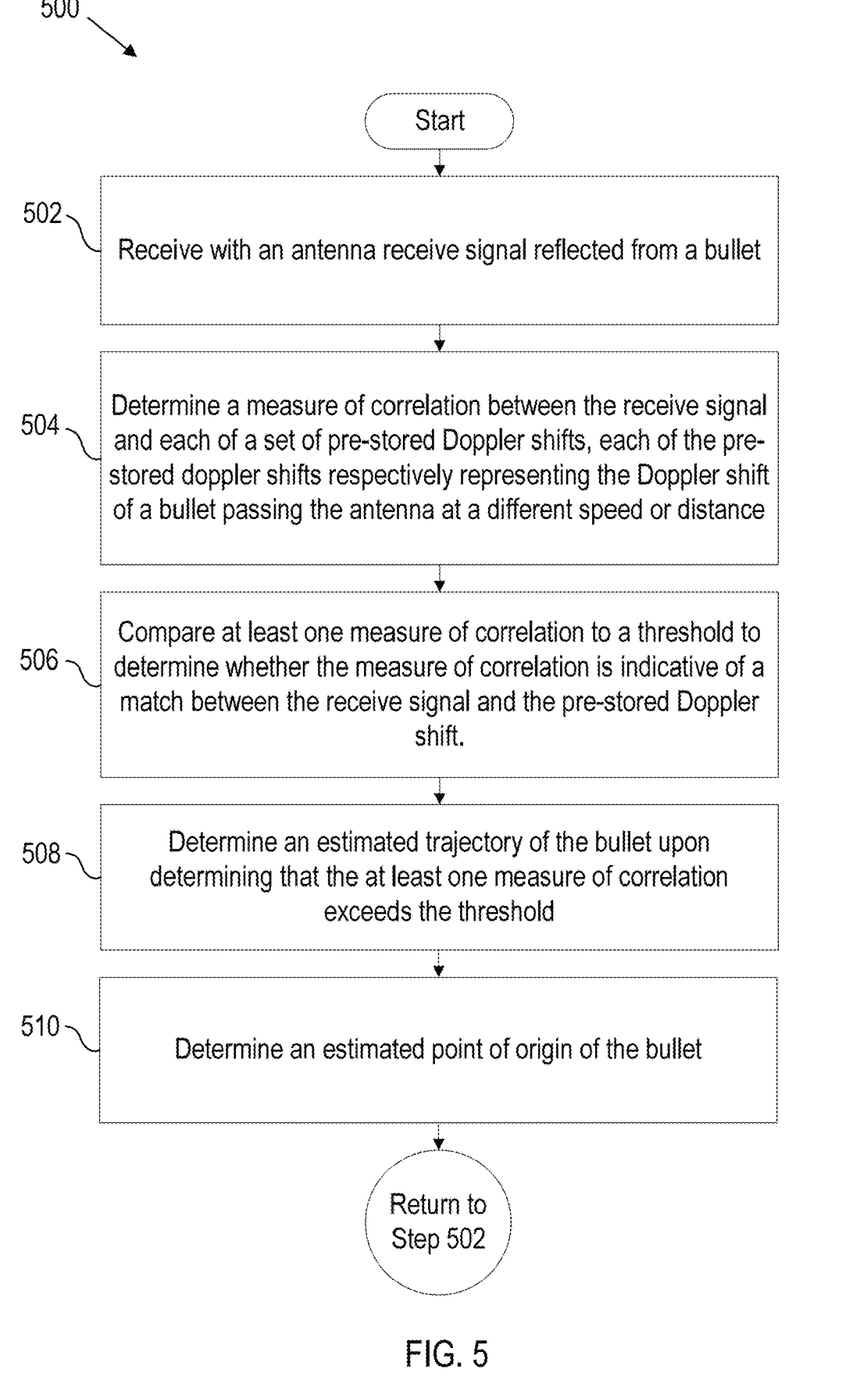
FIG. 5 is a flowchart of a method for detecting high-speed ballistic targets, according to an example.

Turning now to FIG. 4, there is shown an example of a radar 400, which is configured to detect the presence of a passing bullet, as well its speed and the distance of the point of closest approach, azimuth angle, and point of origin. It will be understood that radar 400 is only one example of a radar system that can be employed to detect such characteristics of a bullet, and, that, in alternative examples, any suitable radar configured to perform the functions described herein can be used. Indeed, while radar 400 is an example of a continuous-wave radar, it will be understood that the functions described in this disclosure can be performed using any suitable radar including a pulsed radar.

As shown, radar 400 includes a transmit/receive portion 402, which includes a transmit 404 antenna, a receive antenna 406, a corresponding transmitter 408 and receiver 410, a signal generator 412, and an A/D converter 414. Generally, transmit/receiver portions are known in the art. Thus, this transmit/receive portion is only provided as an example and other suitable transmit/receive portions can be used.

In the example shown, transmitter 408 receives from signal generator 412 a signal to be transmitted by transmit antenna 404. Signal generator 412, in an example, is a local oscillator configured to generate a continuous tone for transmittal. Transmitter 408 amplifies the output of signal generator 412 and filters out any harmonics and intermodulation products present. The output of transmitter 408 is provided to transmit antenna 404 to generate a transmit beam 416. The transmit beam illuminates one or more targets, such as bullet 104, which, as described above, travels along flight path 108 and reflects a return beam 418 that is received by receive antenna 406. Receive antenna 406 produces a receive signal that is proportional to the return beam 418 and which is passed to receiver 410 for initial processing. Generally, receiver 410 sets the noise figure with a low-noise amplifier, mixes the received signal down to an intermediate frequency, and removes the zero and near-zero Doppler frequencies with a notch filter to eliminate ground returns and bleed-through from the transmit antenna. The output of receiver 410, denoted as Receive IF in FIG. 4, is provided to an A/D converter 414 for digitization.

The digitized receive signal is passed to detector 420 for, among other things, detection of a ballistic target. Detector 420, can, in an example, be comprised of one or more processors acting alone or in concert to perform the functions described in this disclosure, including, as appropriate, the steps of method 500. The processor(s) of detector 420 is in communication with one or more non-transitory storage media that store the steps of functions described in this disclosure. In an alternative example, detector 420 can be implemented in hardware, as a collection of analog components, or as a combination of analog components and one or more processors.

Detector 420 includes, in an example, correlator 422, threshold/decision logic module 424, and trajectory estimate module 426. Correlator 422 operates to broadly compare the receive signal to a pre-stored bank of flight path templates to determine whether any component of the receive signal is correlated to one of the pre-stored flight path templates, indicating the presence of a return from a passing bullet in the receive signal. In an example, correlator 422 operates as a set of matched filters and includes baseband/FFT module 428, data buffer 430, a bank of pre-stored flight path templates 432, and multiplier 434. The output of correlator is a set of signals having varying powers, the signal with the highest power represents the template to which the receive signal is the closest match.

In this example, the operation of correlator 422 begins by converting the receive signal to baseband and broken into sections, the frequency spectrum of each section being computed using Fourier analysis. The sections are of set length but determined arbitrarily (it is generally desirable to include some overlap between each section to avoid the return of a target being split over two sections). The result is stored in data buffer 430 and is multiplied by the outputs of the pre-stored flight path template 432. The pre-stored flight path template 432 block stores frequency domain templates of the returns of bullets traveling at various speeds and passing at various distances from the radar (i.e., distance of point of closest approach), as described above. For example, the pre-stored flight path templates can store one set of flight paths for bullets passing at 10 m from radar 400 at various speeds (e.g., 800 m/s, 810 m/s, 820 m/s, etc.), another set at 15 m at various speeds, another set at 20 m at various speeds, and so on. (The granularity of the speeds and distances stored is a design choice and depends on the accuracy desired, at the expense of additional processing.) These outputs are multiplied by the output of the data buffer 430 at multipliers 434.

As those of ordinary skill in the art will appreciate, a matched filter performs a cross-correlation of the template signal and the output of data buffer 430. If a time delayed and attenuated version of the template signal is present in the data buffer, the output of the matched filter is at a maximum. If a time delayed and attenuated version of the template signal is not present in the received signal, the cross-correlation yields a smaller value (as a result of noise in the received signal).

To avoid extensive processing, various search algorithms can be employed to determine the highest of outputs correlator 422, without checking every output. For example, velocity space can be searched until the ridge was found, and then only filters (e.g., perform the multiplications) near the ridge are processed until the peak is found. This permits far fewer processed filters and allows the algorithm to be implemented easier in real-time. Other methods of simplifying the processing are conceivable are within the scope of this disclosure.

It should be understood that the implementation of correlator 422 shown in FIG. 4 is only provided as an example, and that, in alternative examples, correlator 422 can be implemented in any manner suitable for creating a set of matched filter or otherwise for correlating the received signal to one of the pre-stored flight paths.

The outputs from correlator 422 are received at threshold/decision logic module 424. In an example, threshold/decision logic module 424 compares the received outputs to a threshold to determine whether the magnitude of the output is indicative of a match. It should be understood that, due to noise and other vagaries of the receive signal, the threshold will not be set at a value that represents a perfect match, but rather at some value that represents a match within a predetermined degree of confidence. The exact value indicative of a match is a design choice and set to balance the risk of false positives (if the threshold is too low) against false negatives (if the threshold is too high). A value above the threshold indicates the detection of a passing bullet. Such a detection can be used to inform trajectory estimate module to perform an estimation of the bullet's azimuth angle in order to determine, at least, an initial trajectory estimate of the bullet.

In addition, as described above, a match to at least one of the pre-stored flight paths can further be used to estimate the bullet's speed and/or distance of point of closest approach to the antenna, which can then be used to further refine the initial trajectory estimate. As described above, each of the pre-stored flight paths represent the Doppler of shift of a bullet passing the antenna at some predetermined speed and distance. Thus, if a match is found between the receive signal and one of the pre-stored flight paths, the speed and the distance of point of closest approach represented by the Doppler shift of that pre-stored flight path can form the estimate of the bullet's speed and distance of point of closest approach.

If two or more adjacent flight path templates each produce an output that is above the threshold, interpolation between the adjacent flight path templates can be used to estimate the speed and/or distance of the point of closest approach. For example, if two outputs exceed the threshold, one for a bullet traveling at 900 m/s and passing 10 m from the antenna and the other for a bullet traveling at 900 m/s and passing 15 m from the antenna, the estimate can be an interpolation between the two, yielding a bullet traveling at 900 m/s and passing 12.5 m from the antenna. Interpolation need not be exactly halfway between the two values. For example, if one output is higher than the other, the interpolation can be a weighted average according to the relative powers of the two outputs.

If the initial trajectory estimate, based at least one the azimuth angle estimation, does not feature a bullet passing at the estimated distance or at the speed, the trajectory can be corrected to better match the estimated speed and/or distance of the point of closest approach. For example, if the estimated trajectory shows the bullet passing at 15 m, but the estimated distance of closest approach is 12 m, the trajectory can be corrected so that trajectory includes the bullet passing at 12 m.

If two non-adjacent flight path templates each produce an output that is above the threshold, it can be indicative of two bullet detections within the same time window. In this instance, the trajectory estimate module can be configured to determine an angle estimation for each bullet.

Once the trajectory is estimated (this can be the initial estimated trajectory or the trajectory as refined by the estimated speed and/or distance of closest approach), the bullet's origin can be estimated. The estimated origin can take into account the estimated trajectory as well as other known data, such as the bullet's speed. That is, the trajectory is extrapolated to some estimated point outside the radar coverage.

Radar 400 can output to user interface, e.g., via a terminal or screen of a mobile device, the estimated speed, distance point of closest approach, estimated trajectory, and/or the point of origin.

There is shown in FIG. 5 a method 500 for detecting high-speed ballistic targets. The steps of method 500 can be implemented by a radar such as radar 400, described in connection with FIG. 4. Various steps of method 500 can be stored in a non-transitory storage medium and executed by a processor or combination of processors; however, it should be understood that some of the steps can be carried out in hardware or by a combination of hardware and software.

At step 502, a receive signal is received with an antenna over a period of time. After reception, the receive signal can undergo some initial processing, e.g., amplification, down-conversion to an intermediate frequency, filtering to remove ground returns and transmitter bleed-through, as well as digitization. Additional processing before step 502 can include converting the signal to baseband and transforming the receive signal to the frequency domain, e.g., with a fast Fourier transform. This initial processing is considered conventional signal processing to prepare the receive signal for steps 502-510.

At step 504, a measure of correlation is determined between the receive signal and each of a set of pre-stored Doppler shifts. The pre-stored Doppler shifts respectively represent the Doppler shift of a bullet passing the antenna at a different speed or distance of a point of closest approach. Stated differently, each of the pre-stored Doppler shifts differs from each other pre-stored Doppler shift according to the speed, the distance at which the bullet passes the radar antenna, or both. The measure of correlation can be determined with a set of matched filters, each matched filter respectively finding the correlation between the receive signal and one of the pre-stored Doppler shifts. The matched filters, themselves, can be implemented by multiplying the frequency-domain receive signal with the frequency-domain pre-stored Doppler shifts.

The set of pre-stored Doppler shifts, of which the measure of correlation to the receive signal is found, can themselves be a subset of a greater set of pre-stored Doppler shifts. For example, a search algorithm can be employed to determine the subset of the pre-stored Doppler shifts of which the measure of correlation is found. In one example, velocity space can be searched until the ridge was found, and then only Doppler shifts near the ridge are processed until the greatest correlation is found.

At step 506 at least one of measure of correlation, found in step 504, is compared against a threshold to determine whether measure of correlation is indicative of a match. Necessarily, this threshold is less than a perfect match because of noise and other potentials corruptions to the receive signal, but is rather set as a design choice, preferably optimized to exclude both false negatives and false positives to the extent possible.

It is conceivable that only a single measure of correlation could be compared to the threshold. Indeed, it is conceivable, in one example, that only greatest measure of correlation (e.g., the output of the matched filter having the largest power) is compared to the threshold. More typically though, more than one measure of correlation is compared to the threshold in search of a match. This process can occur contemporaneously with step 504—i.e., as measures of correlations are found, they can be compared against the threshold.

At step 508, if the at least one measure of correlation has exceeded the threshold, an estimated trajectory of the bullet is determined according to, at least in part, an azimuth angle estimation angle. Such suitable azimuth angle estimations include, for example, amplitude-comparison monopulse, phase-comparison monopulse, full vector monopulse, or maximum likelihood estimation, although other azimuth angle estimation algorithms could be used.

This estimated trajectory of the bullet could be corrected according to an estimated speed or distance of a point of closest approach, which itself is determined according to at least one of the pre-stored Doppler shifts the measure of correlation of which exceeds the threshold. In one example, the estimated speed or distance of a point of closest approach can be determined according to a single pre-stored Doppler shift. For example, if only one measure of correlation exceeds the threshold, the speed or distance represented by the associated pre-stored Doppler shift can be used as an estimate to correct initial estimated trajectory. If two measures of correlation of two adjacent pre-stored Doppler shifts both exceed the threshold, the estimated speed or the estimated distance can be interpolated from the speed or distance represented by the adjacent pre-stored Doppler shifts.

If the measures of correlation of at least two non-adjacent pre-stored Doppler shifts exceed the threshold, this can represent two bullets detected within the same detection window. In this instance, trajectories can be estimated (and corrected) for each non-adjacent pre-stored Doppler shift that results in the exceeded threshold.

Finally, in step 508, a point of origin of the bullet can be estimated according to the estimated trajectory of the bullet. The estimated trajectory used in this step can be the initial estimated trajectory or the corrected estimated trajectory. Other information, such as the speed of the bullet can also be used in formulating the estimated point of origin. If the bullet was fired within radar coverage, the estimated origin will be the location within the coverage where the bullet was first detected. If, more likely, the bullet originated outside the radar coverage, the estimated origin can be determined by extrapolating out of the radar coverage according to the estimated trajectory and other factors.

From the above steps, at least one of the estimated trajectory, estimated point of origin, estimated speed, or estimated distance of the point of closest approach can be provided to a user via a user interface, such as an attached monitor, a mobile device, etc.

Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g, f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

The functionality described herein, or portions thereof, and its various modifications (hereinafter "the functions") can be implemented, at least in part, via computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A radar system, comprising:
    a receive antenna configured to receive a receive signal reflected from a ballistic target, the receive signal exhibiting a Doppler shift according to motion of the ballistic target; and
    a detector implementing a set of matched filters each configured to determine a measure of correlation between the Doppler shift of the receive signal and one of a set of pre-stored Doppler shifts, wherein each of the pre-stored Doppler shifts respectively represents the Doppler shift of a ballistic target passing the antenna at a different speed or a distance of a point of closest approach;
    wherein the detector is configured to compare the output of at least a first matched filter of the set of matched filters to a threshold to determine whether the output is indicative of a match between the receive signal and the pre-stored Doppler shift of the first matched filter, is further configured to determine an estimated trajectory of the ballistic target based on an azimuth-angle estimation algorithm, upon determining that the output of at least the first matched filter exceeds the threshold, and is further configured to correct the estimated trajectory of the ballistic target according to at least one of an estimated speed or an estimated distance of the point of closest approach, wherein the estimated speed or the estimated distance of the point of closest approach is based, at least in part, on the speed or the distance of the point of closest approach represented by the Doppler shift of the first matched filter.

2. The radar system of claim 1, wherein the detector is further configured to estimate a point of origin of according to, at least, the estimated trajectory of the ballistic target.

3. The radar system of claim 1, wherein the azimuth-angle estimation algorithm is one of amplitude-comparison monopulse, phase-comparison monopulse, full vector monopulse, or maximum likelihood estimation.

4. The radar system of claim 1, wherein the estimated speed is determined by interpolating the speed represented by the Doppler shift of the first matched and a speed represented by a second matched filter, wherein an output of the second matched filter exceeds the threshold.

5. The radar system of claim 1, wherein the estimated distance of the point of closest approach is determined by interpolating the distance of the point of closest approach represented by the Doppler shift of the first matched and a speed represented by a second matched filter, wherein an output of the second matched filter exceeds the threshold.

6. The radar system of claim 1, wherein the radar system is a continuous-wave radar.

7. The radar system of claim 1, wherein the radar system is a pulsed radar.

8. A method for detecting a ballistic target with a radar system, comprising the steps of:
receiving with an antenna a receive signal reflected from a ballistic target, the receive signal exhibiting a Doppler shift according to motion of the ballistic target;
determining a measure of correlation between the Doppler shift of the receive signal and each of a set of pre-stored Doppler shifts, wherein each of the pre-stored Doppler shifts respectively represents the Doppler shift of a ballistic target passing the antenna at a different speed or a distance of a point of closest approach;
comparing the measure of correlation between the receive signal and at least a first pre-stored Doppler shift of the set of pre-stored Doppler shifts to a threshold to determine whether the measure of correlation is indicative of a match between the receive signal and the first pre-stored Doppler shift;
determining an estimated trajectory of the ballistic target based on an azimuth-angle estimation algorithm, upon determining that the measure of correlation between the receive signal and at least the first pre-stored Doppler shift of the set of pre-stored Doppler shifts exceeds the threshold; and
correcting the estimated trajectory of the ballistic target according to at least one of an estimated speed or an estimated distance of the point of closest approach, wherein the estimated speed or the estimated distance of the point of closest approach is based, at least in part, on the speed or the distance of the point of closest approach represented by the first pre-stored Doppler shift.

9. The method of claim 8, further comprising the step of estimating a point of origin of according to, at least, the estimated trajectory of the ballistic target.

10. The method of claim 8, wherein the azimuth-angle estimation algorithm is one of amplitude-comparison monopulse, phase-comparison monopulse, full vector monopulse, or maximum likelihood estimation.

11. The method of claim 8, wherein the estimated speed is determined by interpolating the speed represented by the first pre-stored Doppler shift and a speed represented by a second pre-stored Doppler shift, wherein the measure of correlation between the receive signal and the second pre-stored Doppler shift exceeds the threshold.

12. The method of claim 8, wherein the estimated distance of the point of closest approach is determined by interpolating the distance of the point of closest approach represented by the first pre-stored Doppler shift and a distance of the point of closest approach represented by a second pre-stored Doppler shift, wherein the measure of correlation between the receive signal and the second pre-stored Doppler shift exceeds the threshold.

13. The method of claim 8, wherein the radar system is a continuous-wave radar.

14. The method of claim 8, wherein the radar system is a pulsed radar.

* * * * *